United States Patent [19]

Imai et al.

[11] Patent Number: 4,887,655
[45] Date of Patent: Dec. 19, 1989

[54] HEAVY DUTY-HIGH PRESSURE PNEUMATIC RADIAL TIRES

[75] Inventors: Isamu Imai, Tokorozawa; Norio Inada, Kodaira, both of Japan

[73] Assignee: Bridgestone Corporation, Tokyo, Japan

[21] Appl. No.: 46,363

[22] Filed: May 6, 1987

[30] Foreign Application Priority Data

Jun. 20, 1986 [JP] Japan .............................. 61-142968

[51] Int. Cl.$^4$ .............................................. B60C 9/20
[52] U.S. Cl. ................................... 152/531; 152/540; 152/553
[58] Field of Search ............... 152/527, 540, 531, 548, 152/553, 556, 560, 538, 536

[56] References Cited

U.S. PATENT DOCUMENTS

| | | | |
|---|---|---|---|
| 3,638,705 | 2/1972 | Devienne et al. | 152/560 X |
| 3,841,377 | 10/1974 | Montagne | 152/540 X |
| 3,977,172 | 8/1976 | Kerawalla | 57/902 X |
| 4,088,169 | 5/1978 | Kuroda | 152/540 |
| 4,258,773 | 3/1981 | de St. Michel | 152/527 X |
| 4,445,560 | 5/1984 | Musy | 152/527 X |
| 4,732,199 | 3/1988 | Kajiwara | 152/560 X |

FOREIGN PATENT DOCUMENTS

| | | | |
|---|---|---|---|
| 2458923 | 6/1975 | Fed. Rep. of Germany | 152/540 |
| 2026875 | 1/1980 | Fed. Rep. of Germany | 152/540 |
| 59-89203 | 5/1984 | Japan | 152/556 |
| 61-71204 | 4/1986 | Japan | 152/548 |
| 61-129303 | 6/1986 | Japan | 152/548 |
| 61-268505 | 11/1986 | Japan | 152/560 |
| 2042429 | 9/1980 | United Kingdom | 152/527 |

*Primary Examiner*—Raymond Hoch
*Attorney, Agent, or Firm*—Sughrue, Mion, Zinn, MacPeak & Seas

[57] ABSTRACT

A heavy duty-high pressure pneumatic radial tires are disclosed, which each comprise a main reinforcement consisting of a carcass having an up-and-down type toroid radial construction in which a plurality of plies composed of fiber cords arranged in parallel with one another are turned up around a pair of bead cords on the right and left or the tire while the cords are arranged at angles substnatially along radial planes of the tire, at least one ply including a ply to be brought into direct contact with the bead cords being turned up around each of the bead cores from the inside to the outside of the tire and at least one remaining ply being laminated upon the outer side of the turn-up portion formed by the turn-up end portion of said at least one ply, and a belt which surrounds a crown portion of the carcass and is composed of a plurality of layers of parallel organic fiber cords having at least 150 g/d or an initial modulus higher than that of the cords of the carcass while at least one belt layer is laminated at an cord-arranged angle near substantially 0° with respect to the crown circumference. The plies of the carcass are composed of organic fiber cords having a thermal shrinkage of not less than 1.0% and not more than 10% at 177° C.

12 Claims, 3 Drawing Sheets

FIG. 3
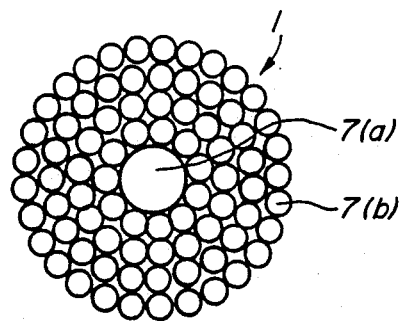
FIG. 4a  FIG. 4b  FIG. 4c  FIG. 4d
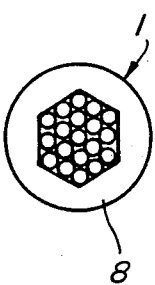 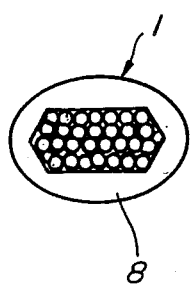 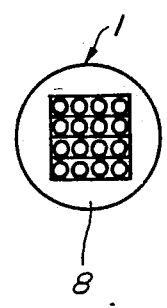 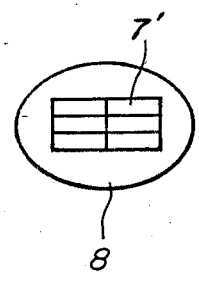

FIG. 5a   FIG. 5b   FIG. 5c
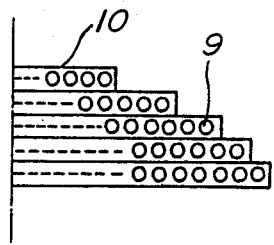
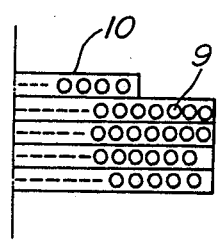
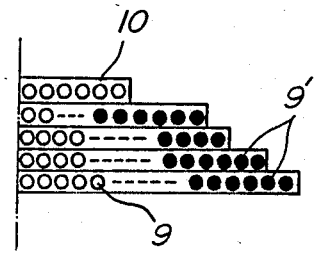
FIG. 6a
*PRIOR ART*
FIG. 6b
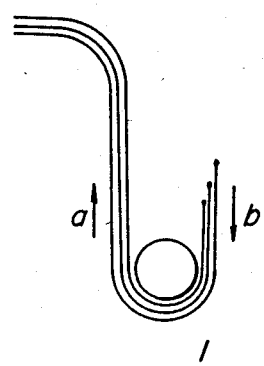
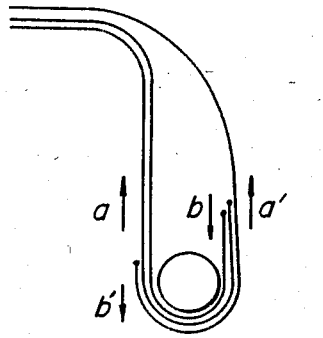

HEAVY DUTY-HIGH PRESSURE PNEUMATIC RADIAL TIRES

BACKGROUND OF THE INVENTION (1) Field of the Invention

The present invention relates to pneumatic tires for use under high internal pressures and heavy loads, and more particularly, the invention relates to results of development and research on heavy duty-high pressure pneumatic radial tires which are adapted for special uses, for instance, to be used under severe conditions, in such as running wheels used in aircraft and super high speed trains (linear motor cars, etc.).

(2) Related Art Statement

In order to meet the demand for a remarkably expanded amount of goods and substances to be transported under a recently conspicuous trend of energy saving, it is a priority problem how to satisfy need for weight reduction which have been up to now most required in tires for aircraft, etc.

In high internal pressure heavy duty pneumatic tires of this kind, bias construction carcasses have been principally employed to date. However, since these tires need a greater number of plies, they do not fit the tire weight reduction criteria. This is an origin from which radial tires have begun to be examined.

Japanese patent application Laid-open No. 61-71,206 mainly discloses how to select a material for reinforcing cords in a radial construction carcass, principally aiming at supplement of an insufficient shock-mitigating power of aircraft tires which originates from the replacement of a bias construction carcass by the radial construction carcass.

As compared with bias tires, the aircraft tires or heavy duty-high pressure pneumatic radial tires which are served in similar uses thereto are more advantageous with respect to weight reduction. However, since use conditions are severer in such tires, decisive reinforcing materials and structures have not been obtained yet, and are still under study and examination. From a standpoint of high speed durability, it is common to adopt an arrangement of a belt surrounding a carcass in which a plurality of belt cord layers including a layer of organic fiber cords are arranged at an angle near substantially 0° with respect to the circumference of the crown of the carcass. For this purpose, an examination has been made of aromatic polyamide fibers, nylon, polyester, rayons etc. On the other hand, any special proposal has not been made with respect to carcasses including materials thereof excluding that the carcasses have come to be designed in a radial construction.

In radial tires of this kind, since a tension acts upon cords of the carcass ply due to deformation originating from application of high pressure air (10 to 16 kg/cm$^2$) and a load, a pullout force is exerted upon a turn-up end portion of the carcass ply wound around a bead core at a bead portion and a shearing force acts between the ply layers of the carcass. These forces are repeatedly exerted upon the tire when the tire rolls, which leads to ply separation.

However, use of an additional reinforcement to cope with the ply separation, needless to say, is contradictory to the weight reduction of the tire.

SUMMARY OF THE INVENTION

The present inventors have found that the above-mentioned pullout force exerting upon the turn-up end portion of the carcass can be advantageously reduced by adopting a so-called up-and-down end fixing structure in which when a plurality of plies are to be wound around a bead core at a bead portion, at least one ply including a ply to be brought into direct contact with a bead core is turned up from inside to the outside of the tire and at least one remaining ply is laminated upon the outer side of the turn-up end portion formed by the above turning up the at least one ply.

Reverse tensile forces are offset around the bead between the turn-up ply and the turn-down ply. The larger the distance from the bead core, the larger a moment around the bead core which is originated from the tensile force of the cords of the carcass ply. While the tensile forces are balanced by the above-mentioned up-and-down end fixing structure, a flexural rigidity at the bead portion increases and a shearing strain between the carcass layers at the bead portion under loading becomes smaller, so that separation resistance is improved.

However, on the other hand, growth of the crown portion during a high speed running becomes larger by an increment of the rigidity at the bead portions, which is disadvantageous in high speed durability. In order to restrain such a growth of the crown portion, it is necessary to design a belt, which consists of a plurality of layers composed of parallel organic fiber cords having a larger tenacity than those of the carcass and surrounding the crown portion of the carcass, in such a belt laminate construction that at least one belt layer is placed at a cord-arranged angle near substantially 0° with respect to the circumference of the crown and the remaining belt layers are arranged such that the cords of one layer may intersect with those of the adjacent one at a small cord-arranged angle with respect to the crown circumference. As a matter of course, it is more preferable that the cords of all the belt layers are arranged at a cord-arranged angle near substantially 0° with respect to the crown circumference. As the cords used in the belt, aramide fiber cords are ordinarily used, but other fiber cords of such as aromatic polyester, high elasticity high tenacity vinylon, etc. have been recently used in trials.

Thus, it is an object of the present invention to provide a heavy duty-high pressure pneumatic radial tire comprising a main reinforcement consisting of a carcass having an up-and-down type toroid radial construction in which a plurality of plies composed of fiber cords arranged in parallel with one another are turned up around a pair of bead cores on the right and left of the tire while the cords are arranged at angles substantially along radial planes of the tire, at least one ply including a ply to be brought into direct contact with the bead cores being turned up around each of the bead cores from the inside to the outside of the tire and at least one remaining ply being laminated upon the outer side of the turn-up portion formed by the turn-up end portion of said at least one ply, and a belt which surrounds a crown portion of the carcass and is composed of a plurality of layers of parallel organic fiber cords having at least 150 g/d of an initial modulus higher than that of the cords of the carcass while at least one belt layer is laminated at a cord-arranged angle near substantially 0° with respect to the crown circumference; the plies of the carcass being composed of organic fiber cords having a thermal shrinkage of not less than 1.0% and not more than 10% at 177° C.; and the bead cores are braided bead cores of a substantially circular section formed of helically stranded steel wires wound around a core wire.

It is another object of the present invention to provide heavy duty-high pressure pnuematic radial tires each comprising a main reinforcement consisting of a carcass of an up-and-down type toroid radial construction in which a plurality of plies composed of fiber cords arranged in parallel with one another are turned up around a pair of bead cores on the right and left of the tire while the cords are arranged at angles substantially along radial planes of the tire, at least one ply including a ply to be brought into direct contact with the bead cores being turned up around each of the bead cores from the inside to the outside of the tire and at least one remaining ply being laminated upon the outer side of the turn-up portion formed by the turn-up end portion of said at least one ply, and a belt which surrounds a crown portion of the carcass and is composed of a plurality of layers of parallel organic fiber cords having at least 150 g/d of an initial modulus higher than that of the cords of the carcass while at least one belt layer is laminated at an cord-arranged angle near substantially 0° with respect to the crown circumference; the plies of the carcass being composed of organic fiber cords having a thermal shrinkage percentage of not less than 1.0% and not more than 10% at 177° C.; and the bead cores each having a smooth surface exhibiting a round sectional contour of at least partially circle or ellipse at a portion facing the ply turn-up region and being covered with a rubber or plastics having a JIS hardness in a range from 70° to 96°.

According to the present invention, the durability of the bead portions of the heavy duty-high pressure pneumatic radial tires such as aircraft tires is advantageously improved together with high speed durability.

These and other objects, features and advantages of the present invention will be appreciated upon reading of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings wherein:

FIG. 3 is a sectional view of a bead core;

FIGS. 4(a) through 4(c) are sectional views of modifications of bead cores;

FIGS. 5(a) through 5(c) are sectional views of illustrating belt structures; and FIGS. 6(a) and 6(b) are views of illustrating a behavior of pullout forces at a turn-up portion of carcass plies.

DETAILED DESCRIPTION OF THE INVENTION

Figure 1:
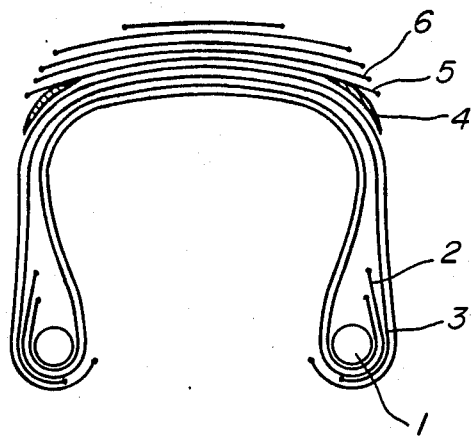
FIG. 1 is a diagrammatic sectional view of a principal portion of a tire according to the present invention.

FIG. 1 is a diagrammatic sectional view of a tire according to the present invention. In FIG. 1, reference numerals 1, 2 and 3 denote a bead wire, an outward carcass turn-up portion of a carcass ply, and an inwardly turn-down end fixing portion, respectively, while reference numerals 4, and 5 and 6 denote a cushion rubber and belts, respectively. The belt layer 5 is a layer in which cords are arranged at an angle near substantially 0° with respect to a circumference of a crown, and the belt layer 6 is a layer being adjacent the carcass and having the cords arranged at a relatively large angle.

According to the present invention, the carcass is designed in an up-and-down type toroid radial construction shown in which a plurality of plies composed of fiber cords arrayed in parallel with one another are arranged while the cords are arranged at an angle of 90° to about 75° at the least with respect to the tread equator of the tire along substantial radial planes of the tire. As the carcass plies, cords having a thermal shrinkage percentage being not less than 1.0% and not more than 10.0% at 177° C., particularly nylon (6,66 and 46), polyester, rayon and vinylon etc. are preferably used.

Figure 2A:
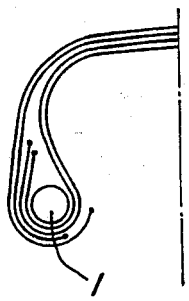
FIGS. 2(a) through 2(c) are sectional views diagrammatically illustrating bead portions.
Figure 2B:
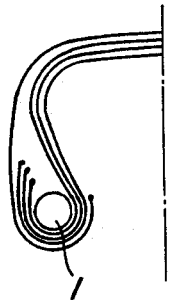
Figure 2C:
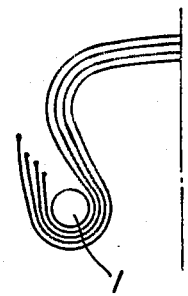

The carcass is conventionally of a turn-up construction in which the carcass is turned up around a bead core 1 from the inside to the outside of the tire as shown in FIG. 2(c). To the contrary, according to the present invention, in addition to the construction shown in FIG. 1 and 2(a), as illustrated in FIG. 2(b), the carcass may be an end fixing construction in which three of four plies are turned up and one remaining ply is turned down.

A tensile force which acts upon the carcass ply-wound bead core 1 in the above up-and-down end fixing construction is great. Therefore, if the bead core has an angular sectional shape, the carcass ply is liable to be damaged or cut due to repeated application of a frictional force acting there during the tire rolling. Moreover, when a green tire is placed into a mold and then pressurized by a bladder in vulcanization of the tire, the distance of the bead portions of the green tire narrows. At that time, when a carcass turn-up portion does not slightly slip, the cords of the ply are disturbed. However, the cord disturbance can not be removed only by the slipping at the turn-up portion. Thus, in the case of the cable bead having a substantially round section shown in FIG. 3 and beads having polygonal sections shown in FIGS. 4(a) through 4(d), a covering 8 made of a hard rubber or plastics exhibiting a partially round or elliptical sectional contour is provided at least at a portion facing the turn-up portion of the ply. As a matter of course, as a bead core 1, use may be made of a bead core in which wire strands or rectangular section filaments 7 are adhered with one another by using an insulation rubber. The rubber used as the covering 8 for the bead core 1 suitably has a JIS hardness in a range of 70° to 96°. A reference numeral 7' denotes a plate-like wire.

In order to promote the prevention of the cord disturbance at the bead portion during the vulcanization of the tire, it is necessary that the carcass ply has a thermal shrinkage percentage of 1.0 to 10.0% at 177° C. In particular, when the number of the plies of the carcass is greater, the above range serves to correct difference in the passing way between the opposite beads of the cords.

Next, the flexural rigidity near the bead portion is increased by the up-and-down end fixing construction of the carcass ply, so that the shearing strain between the carcass layers at the bead portion during application of a load decreases, and the separation resistance is improved. To the contrary, the growth of the crown portion during high speed running increases by an increment of the rigidity, which is disadvantageous from the standpoint of the high speed durability. In order to suppress this growth, an organic fiber cord having a modulus of elasticity of not less than 150 g/d, for instance, aramide fibers (Kevlar and HM-50 having the following chemical structural formulae, respectively),

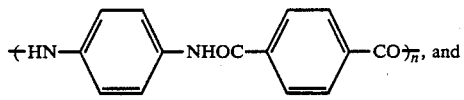, and

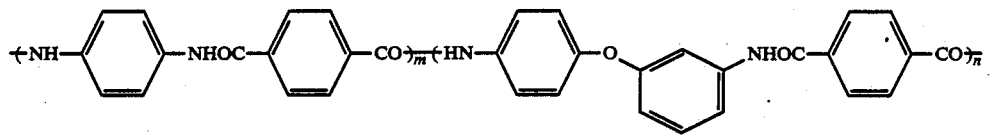

and high elasticity high tenacity vinylon are appropriately used as a belt.

FIGS. 5(a) through 5(c) diagrammatically illustrate examples of reinforcing laminate layers of belts 6. In the Figures, reference numerals 9 and 10 denote an organic fiber cord and a coating rubber, respectively. In FIG. 5(a), the reinforcing layers are successively made narrower from the carcass side. But, the present invention is not restricted thereto. As shown in FIGS. 5(b), it may be that the width of the outermost layer is narrower and the remaining layers are of the same width, or as shown in FIG. 5(c), the twisting shrinkage percentage of the organic fiber cords 9 arranged on the opposite side regions being 0.6 times the entire width of the each reinforcing layer excluding the central region, is at least about 1% but not more than about 5%.

The twisting shrinkage percentage (%) is ordinarily from 3 to 15%, and is expressed by a percentage of a shortened length of a cord when a bundle of filaments arranged is twisted. With respect to the cord made of the same system (Kevlar and Kevlar, Kevlar and HM-50, nylon 6 and nylon 66), it is recognized that the greater the percentage, the larger the elongation at break of the cord. With respect to the cord of the single cord construction or the single strand construction, the larger the number of turns, the larger the twisting shrinkage. In the case of the double strand construction in which a ply twist and a cable twist are inversely twisted, the contribution of the number of the ply twists upon the twisting shrinkage differs from that of the number of the cable twists. In this case, the cord having a larger twisting shrinkage percentage has a greater elongation at break. Therefore, the numbers of the ply twists and the cable twists are determined under consideration of other required properties such as fatigue resistance, tenacity properties, etc. to increase the twisting shrinkage to enlarge the thermal shrinkage.

To a bead portion of a radial construction is exerted a force, which is to pull out the carcass end portions turned up around the bead core 1 due to tensile forces a, b, a' and b' acting upon the carcass cords when an internal pressure and a load are applied to the tire (see FIGS. 6(a) and 6(b), as well as a shearing strain acting between carcass layers due to deformation of the carcass under the load. It is considered that separation occurs at the bead portion when such forces are repeatedly applied. Therefore, in order to restrain the pullout force at the carcass end portion and the deformation of the carcass, various reinforcing members have conventionally been used. However, if many reinforcing members are used, the weight of the tire increases. Consequently, it does not meet the need for desirable aircraft radial tires.

To the contrary, in the case of a radial carcass which is formed by at least one pair of right and left bead cores and carcass cords wound therearound, the carcass layer positioned on the inner side of the tire is turned up from the inside to the outside, while at least one carcass layer as counted from the outermost layer is turned up from the outside to the inside of the tire. By adopting such a construction, the pullout force at the turn-up end portions can be reduced. That is, when all the carcass layers are turned up only in a single direction as done in the prior art, a pullout force is developed concentrically in a one way direction. On the other hand, according to the present invention, the reverse pullout forces act to be offset. Further, the outer carcass layer effectively has a larger moment due to the tensile force of the carcass cords around the bead core. In addition, the flexural rigidity of the bead portion formed by the carcass layers to which the tensile forces act becomes extremely higher and the shearing strain between the carcass layers at the bead portion under application of the load becomes smaller so that separation resistance is improved. On the other hand, the growth of the crown portion during high speed running becomes larger by an increment of the rigidity of the bead portion, which is disadvantageous in high speed durability. Therefore, in order to restrain the growth of the crown portion, it is necessary to use a belt in which cords having a modulus of elasticity not less than 150 g/d are arranged substantially in parallel with the tire circumferential direction. Further, the cords of the carcass plies wound around the bead cores receive a great tensile force. When the bead core has a polygonal section, there occurs a phenomenon that the cords are readily cut due to the repeated frictional force between the core and cords. In view of this, the sectional shape of the bead core must be designed round or elliptical. However, even if the bead core has a polygonal section, it may be designed to have a round or elliptical sectional shape in entirety by reinforcing it with a hard rubber or the like. For still other reason, it is necessary that a slight slip is present between the bead core and the carcass on the production of the tire. Since the distance between the right and left bead wires becomes narrower particularly when a green tire is sealingly charged into a vulcanization kiln, the carcass cords at the bead portion are greatly disturbed if no slip is allowed. Even if such a slip occurs, the disturbance occurs to a slight degree. Thus, the material of the carcass cord is important, and it is necessary to correct the disturbance by utilizing the shrinkage of the cords at the time of the vulcanization. Further, the reason why the cords need to be thermally shrinkable is that if the number of the carcass layers is large, the cord shrinkage is necessary to correct difference in the cord passing way between the beads. That is, the carcass cords need to have a thermal shrinkage percentage of not less than 1.0% at 177° C.

If the hardness of the rubber used for covering the bead is less than 70°, the effect of preventing wearing of the carcass cords due to rubbing between the carcass cords wound around the bead and the bead core cannot be expected and the shearing strain between the carcass cords and the bead core becomes larger, so that the durability at the carcass ply end is deteriorated.

On the other hand, if the hardness of the rubber used for covering the bead is more than 96°, workability of the unvulcanizate is poor. Thus, such is not practical. Further, it is difficult to ensure the adhesion to the rubber covering the carcass ply after the vulcanization.

In Example 11, a bead core as shown in FIG. 4a was used. In the same manner, bead cores shown in FIGS. 4b, 4c and 4d may be similarly manufactured and similar effects can be obtained.

In the present invention, when a braided bead core, that is, "cable bead core", having a substantially circular section formed of helically stranded steels wires wound around a core wire is used as a bead core, the same effects as mentioned above can be expected even when the bead core is not covered with rubber having a hardness of 70° to 96°.

The present invention will be explained in more detail with reference to the following examples. These examples are merely given in illustration of the invention, but should never be interpreted to limit the scope of the invention.

Aircraft radial tires having reinforcing constructions as shown in FIG. 1 were prepared. A tire size was H 46×18 R 20. In this case, Kevlar of Dupont and HM-50 of Teijin Co., Ltd. were used as aramide cords for belt cords. The cords (numbers of the ply twists and the cable twists) both had a denier of 3000 d/3 (18×18), and were used after being thermally treated with a given adhesive.

Next, the carcass cords were arranged at 90° with respect to a tire circumference in this Example. However, the cords may be arranged at an angle of 90° to 70°. As the cords, 66 nylon of 1890 d/3 (25×25) or Kevlar of 1500 d/2 (32×32) was used to form four layers of the carcass. An end count of the ply of the belt was selectively determined depending upon a material used to make the tenacity per unit width constant.

As the bead core, use was made in Comparative Example 1 and Comparative Example 6 of a hexagonal bead, that is, a bead core which was obtained by repeatedly winding a steel wire having a tenacity of 340 kg/wire at a specific diameter at a total number of turns being 185 while arranging the wire in a sectional hexagonal wound shape. In Example 11, a bead core shown in FIG. 4(a) was used. This bead was produced as follows:

A rubber composition shown in the following was kneaded by means of a Banbury mixer, and converted into a sheet having a gauge of 3 to 5 mm and a desired width. This sheet was wound as a covering sheet around the above-mentioned hexagonal bead to obtain a desired thickness of the covering rubber. A resulting wound bead was vulcanized in a mold having a circular section to a semi-vulcanized state corresponding to a half of a premium vulcanized degree to be served as the bead.

| Rubber Composition | |
|---|---|
| Natural rubber | 50 PHR |
| SBR 1507 | 50 |
| Carbon black HAF | 80 |
| Aromatic oil | 4 |
| ZnO | 8 |
| Antioxidant N,N'—diaryl-p-phenylenediamine | 0.5 |
| Accelerator Diphenylguanidine | 0.7 |
| Accelerator Tetramethylthiuramdisulfide | 0.3 |
| Sulfur | 10 |

The JIS hardness of the above rubber composition after the tire was vulcanized was 80°. In Examples 2, 3, 4, 7 and 8 and Comparative Examples 5, 9 and 10, the cable bead core as shown in FIG. 3 was used. Referring to FIG. 3, steel wires having a diameter of 2.2 mm were twisted in four layers around a core filament 7(a) having a diameter of 6.0 mm while a twisting direction was alternatively reversed layer by layer. That is, twisting construction was 1×6.0 mm+(11+17+23+29)×2.2 mm and the twisting pitch was 6 turns per bead in the case of the first and second layers from the innermost layer side and 5 turns per bead in the case of the third and fourth layers.

The cable cords is not limited to the above-mentioned construciton. Use may be favorably made of a braided bead core having a substantially circular section formed of helically stranded steel wires around a core wire in three to five layers.

FIGS. 5(a) through 5(c) show sectional views of belts used in the present invention, and FIGS. 6(a) and 6(b) both show sectional views of carcass structures at bead portions used in the present invention and in prior art for comparison purpose.

Tire performances using the above-mentioned structures and materials are shown in the following Table.

TABLE (a)

| | | Comparative Example 1 | Example 2 | Example 3 | Example 4 |
|---|---|---|---|---|---|
| Belt | Construction | FIG. 5(a) | FIG. 5(a) | FIG. 5(b) | FIG. 5(b) |
| | Cord kind | Kevlar | Kevlar | Kevlar | HM-50 |
| | Twisting shrinkage (%) | 7.0 | 7.0 | 7.0 | 7.0 |
| | Tenacity (kg) | 165 | 165 | 165 | 175 |
| | Initial modulus (g/d) | 200 | 200 | 200 | 200 |
| | Cord-arranged portion | entire belt portion | entire belt portion | entire belt portion | entire belt portion |
| Carcass | Construction | FIG. 2(a) | FIG. 2(b) | FIG. 2(c) | FIG. 2(c) |
| | Cord kind | 66 nylon | 66 nylon | 66 nylon | 66 nylon |
| | Thermal shrinkage (%) | 6 | 6 | 6 | 6 |
| | Bead sectional shape | hexagonal | FIG. 3 | FIG. 3 | FIG. 3 |
| Tire performances | High speed durability (times) | 5 | 50 | 50 | 50 |
| | Trouble | burst at bead portion | — | — | — |
| | Bead durability (km) | 450 | 4,200 | 4,800 | 4,850 |

TABLE (a)-continued

|  | Comparative Example 1 | Example 2 | Example 3 | Example 4 |
|---|---|---|---|---|
| Trouble | carcass end separation | carcass layer separation at bead portion | carcass layer separation at bead portion | carcass layer separation at bead portion |
| Hydraulic test (kg/cm$^2$) | 65 | 65 | 63 | 66 |
| Trouble | burst at belt portion | burst at belt portion | burst at belt portion | burst at belt portion |

TABLE (b)

|  |  | Comparative Example 5 | Comparative Example 6 | Example 7 | | Example 8 | |
|---|---|---|---|---|---|---|---|
| Belt | Construction | FIG. 5(b) | FIG. 5(b) | FIG. 5(b) | | FIG. 5(c) | |
|  | Cord kind | Kevlar | Kevlar | Kevlar | | Kevlar | |
|  | Twisting shrinkage (%) | 7.0 | 7.0 | 7.0 | 9.0 | 7.0 | 9.0 |
|  | Tenacity (kg) | 165 | 165 | 165 | 150 | 165 | 150 |
|  | Initial modulus (g/d) | 200 | 200 | 200 | 170 | 200 | 170 |
|  | Cord-arranged portion | entire belt portion | entire belt portion | central belt portion | opposite shoulder portion | central belt portion | opposite shoulder portion |
| Carcass | Construction | FIG. 2(c) | FIG. 2(c) | FIG. 2(c) | | FIG. 2(c) | |
|  | Cord kind | Kevlar | 66 nylon | 66 nylon | | 66 nylon | |
|  | Thermal shrinkage (%) | 0.2 | 6 | 6 | | 6 | |
|  | Bead sectional shape | FIG. 3 | hexagonal | FIG. 3 | | FIG. 3 | |
| Tire performances | High speed durability (times) | 50 | 80 | 50 | | 50 | |
|  | Trouble | — | burst at bead portion | — | | — | |
|  | Bead durability (km) | 600 | 2,100 | 4,600 | | 4,700 | |
|  | Trouble | burst at side portion | burst at bead portion | carcass layer separation at bead portion | | carcass layer separation at bead portion | |
|  | Hydraulic test (kg/cm$^2$) | 55 | 60 | 65 | | 64 | |
|  | Trouble | burst at side portion | burst at bead portion | burst at belt portion | | burst at belt portion | |

TABLE (c)

|  |  | Comparative Example 9 | Comparative Example 10 | Example 11 |
|---|---|---|---|---|
| Belt | Construction | Intersecting belt | FIG. 5(b) | FIG. 5(b) |
|  | Cord kind | Kevlar | 66 nylon | Kevlar |
|  | Twisting shrinkage (%) | 7.0 | 9.0 | 7.0 |
|  | Tenacity (kg) | 165 | 65 | 165 |
|  | Initial modulus (g/d) | 200 | 55 | 200 |
|  | Cord-arranged portion | entire belt portion | entire belt portion | entire belt portion |
| Carcass | Construction | FIG. 2(b) | FIG. 2(c) | FIG. 2(c) |
|  | Cord kind | 66 nylon | 66 nylon | 66 nylon |
|  | Thermal Shrinkage (%) | 6 | 6 | 6 |
|  | Bead sectional shape | FIG. 3 | FIG. 3 | FIG. 4a |
| Tire performances | High speed durability (times) | 2 | 38 | 50 |
|  | Trouble | separation at belt portion | separation between belt and tread | — |
|  | Bead durability (km) | 570 | 1,110 | 4,300 |
|  | Trouble | carcass layer separation at bead portion | separation between belt and tread | carcass layer separation at bead portion |
|  | Hydraulic test (kg/cm$^2$) | 68 | 68 | 65 |
|  | Trouble | burst at belt portion | burst at side portion | burst at side portion |

Note:
Modulus of elasticity: determined by JIS L-1017 from an S-S curve of a cord
Thermal shrinkage: A cord of 50 cm long to which a weight of 20 g was attached was left in a thermostat vessel at 177° C. for 30 minutes, and a thermal shrinkage was determined by dividing a shrinked length of the cord by the initial length thereof (50 mm).
High speed durability: A tire was pushed to a drum at an internal pressure of 15.0 kg/cm$^2$ under a load of 20 tons, and increased speed from 0 to 225 MPH in 60 seconds. This operation was taken as "one cycle", and after the tire was cooled to a given temperature and the same operation was repeated. The above cycles were repeated 50 times and when no abnormality was observed at 50 times cycles, it was called "complete running" and shown as "50".
Bead durability: A tire was pushed to a drum at an internal pressure of 15 kg/cm$^2$ under a load of 20 tons, and run at a speed of 10 MPH until a trouble occurred. Results were shown by a total running kilometers.
Hydraulic pressure test: hydraulic pressure value which caused a trouble.

Comparative Example 1 includes a carcass structure in which a carcass ply is turned up in a one way direction. Its bead durability was insufficient so that separation occurred in the turn-up end portion of the carcass. Further, although the carcass cords were cut in the bead portion on a high speed durability test drum, which is considered due to use of the hexagonal bead. Examples 2, 3 and 4 embodied the present invention, and had sufficient high speed resistance and bead durability.

Comparative Example 5 used Kevlar as the carcass material, and the Kevlar cords were cut at the side portion during the bead durability test. The same phenomenon was occurred in the hydraulic pressure test, and a cord-waving or a local unwinding occurred at the non-cut cord portion. In particular, the inner carcass cord suffered greater degree of the unwinding.

Comparative Example 6 corresponds to Example 3 excluding that the hexagonal beads were used. As in the case with Comparative Example 1, the carcass cords were cut at the bead portion during the high speed durability test. Comparative Example 6 was dissatisfactory with respect to the bead durability test and similar troubles occurred.

Example 7 is a tire in which the number of twists of Kevlar was varied between the central portion and the shoulder portion of the belt to change the twisting shrinkage percentage. The cord construction was 3000 d/3 (18×18) at the central portion and 3000 d/3 (21×21) at the shoulder portion.

A belt construction in FIG. 4(c) was used in Example 8, and the same Kevlar cords as in Example 7 were used. Example 8 exhibited sufficient levels of the high speed durability and the bead durability.

Comparative Example 9 uses, as a belt, four layers in which cords were buried at an angle of 25° relative to the tire circumferential direction, and the sectional shape was made the same as in FIG. 4(a). The cords in one layer were made intersected with those of the adjacent layer. However, separation occurred at the belt portion due to the high internal pressure and high speed.

In Comparative Example 10, 66 nylon of 1890 d/2/2 (22×22) was used as a belt cord. The initial modulus was insufficient, the growth of the crown portion was great, and separation occurred between the tread and the belt at the crown-grown portion.

As mentioned in the above, the sectional shape of the bead core or the composite type bead core, the turn-up structure of the carcass layer at the bead core, and material of the carcass cord, the construction of the belt layer, and the cord physical properties are important factors for the durability of the tires.

According to the present invention, durability of the bead portions of heavy duty-high pressure radial pneumatic tires such as aircraft tires, which are used under severe conditions, can be advantageously improved together with high speed durability.

What is claimed is:

1. A heavy duty - high pressure pneumatic radial tire comprising; a main reinforcement consisting of a carcass having an up-and-down type toroid radial construction in which a plurality of plies composed of fiber cords arranged in parallel with one another are turned up around a pair of bead cores on the right and left of the tire while the cords are arranged at angles substantially along radial planes of the tire, at least one ply including a ply to be brought into direct contact with the bead cores being turned up around each of the bead cores from the inside to the outside of the tire and a least one remaining ply being laminated upon the outer side of the turn-up portion formed by the turn-up end portion of said at least one ply, and a belt which surrounds a crown portion of the carcass and composed of a plurality of layers of parallel organic fiber cords having an initial modulus of at least 150 g/d which is higher than that of the cords of the carcass while at least one belt layer is laminated at a cord-arranged angle near substantially 0° with respect to the crown circumference, said belt including a layer composed of cords having a larger twisting shrinkage at the widthwise opposite shoulder regions than at the central portion, the plies of the carcass being composed of organic fiber cords having a thermal shrinkage of not less than 1.0 and not more than 10% at 177° C.; and the bead cores are braided bead cores of a substantially circular section formed of helically stranded steel wires wound around a core wire.

2. A heavy duty - high pressure pneumatic radial tire of claim 1, wherein said belt layers are arranged in an order successively narrower from the carcass side.

3. A heavy duty - high pressure pneumatic radial tire of claim 1, wherein said belt layers are arranged such that an outermost layer is narrower than remaining layers and the remaining layers have the same width.

4. A heavy duty - high pressure pneumatic radial tire of claim 1, wherein said fiber cords of said belt have a twisting shrinkage in the range of 3 to 15%.

5. A heavy duty - high pressure pneumatic radial tire comprising; a main reinforcement consisting of a carcass having an up-and-down toroid radial construction in which a plurality of plies composed of fiber cords arranged in parallel with one another are turned up around a pair of bead cores on the right and left of the tire while the cords are arranged at angles substantially along radial planes of the tire, at least one ply including a ply to be brought into direct contact with the bead cores being turned up around each of the bead cores from the inside to the outside of the tire and at least one remaining ply being laminated upon the outer side of the turn-up portion formed by the turn-up end portion of said at least one ply, and a belt which surrounds a crown portion of the carcass and composed of a plurality of layers of parallel organic fiber cords having an initial modulus of at least 150 g/d which is higher than that of the cords of the carcass while at least one belt layer is laminated at a cord-arranged angle near substantially 0° with respect to the crown circumference, said belt including a layer composed of cords having a larger twisting shrinkage at the width wise opposite shoulder regions than at the central portion, the plies of the carcass being composed of organic fiber cords having a thermal shrinkage of not less than 1.0% and not more than 10% at 177°C.; and the bead cores each having a smooth outside surface exhibiting a round sectional contour of at least partially circle or ellipse at a portion facing the ply turn-up region and being covered with a rubber or plastics having a JIS hardness in a range from 70° to 96°.

6. A heavy duty - high pressure pneumatic radial tire of claim 5, wherein said belt layers are arranged in an order successively narrower from the carcass side.

7. A heavy duty - high pressure pneumatic radial tier of claim 5, wherein said belt layers are arranged such that an outermost layer is narrower than remaining layers and the remaining layers have the same width.

8. A heavy duty - high pressure pneumatic radial tire of claim 5, wherein said fiber cords of said belt have a twisting shrinkage in the range of 3 to 15%.

9. A heavy - duty high pressure pneumatic radial tire of claim 5, wherein said bead cores are composed of a steel wire wound into a hexagonal bead and covered with a rubber composition molded to a circular section.

10. A heavy duty - high pressure pneumatic radial tire of claim 5, wherein said bead cores are composed of a steel wire wound into an elongated hexagonal bead and covered with a rubber composition molded into an ellipsoidal cross-section.

11. A heavy duty - high pressure pneumatic radial tire of claim 5, wherein said bead cores comprise an array of plate-like wires covered by a rubber composition molded into an ellipsoidal cross-section.

12. A heavy duty - high pressure pneumatic radial tire of claim 5, wherein said bead cores comprise a plurality of rectangular section filaments covered by a rubber composition molded into a circular cross-section.

* * * * *